Patented Aug. 23, 1932

1,872,834

UNITED STATES PATENT OFFICE

FREDERICK W. SKIRROW, OF SHAWINIGAN FALLS, QUEBEC, CANADA, ASSIGNOR TO CANADIAN ELECTRO PRODUCTS COMPANY, LIMITED, OF MONTREAL, QUEBEC, CANADA

PROCESS OF MAKING REACTION PRODUCTS OF VINYL ESTERS AND ALDEHYDES

No Drawing. Application filed December 12, 1928. Serial No. 325,661.

This invention relates to the manufacture of reaction products of saturated aliphatic aldehydes and aliphatic vinyl esters, and the object of the invention is to provide a process for the manufacture of these products which may be operated with certainty and on a commercial scale.

Experience has shown that, whatever the cause may be, considerable uncertainty attaches to the reaction of saturated aliphatic aldehydes and aliphatic vinyl esters when attempted without catalysts. This condition is obviously unsatisfactory for commercial operations.

It has now been discovered that if a suitable amount of benzoyl peroxide is added to the reaction mixture as catalyst, the reaction proceeds with certainty and the results as to extent of reaction, products, time, etc. may be predicted with reasonable accuracy.

The following example illustrates the discovery but it will be understood that the invention or discovery is not confined to the particular reagents, as others may be substituted, or to the particular times, temperatures, proportions and methods of treatment as these may be varied for the reagents used as well as for other reagents;—

Example

Seventy-six (76) pounds of vinyl acetate made from acetylene is heated with thirteen (13) pounds of acetaldehyde and twenty (20) grams (=.06%) benzoyl peroxide in a bomb for one hour at 140° C. On distilling off the unchanged vinyl acetate and aldehyde, there remains approximately forty-eight pound of condensation product.

If the benzoyl peroxide catalyst is omitted, the reaction may or may not occur, the reason for uncertainty of reaction not being definitely known.

Other saturated aliphatic aldehydes, such as butyraldehyde or propyl aldehyde, etc., may be reacted in similar manner with vinyl acetate, or other aliphatic vinyl esters such as vinyl propionate, vinyl butyrate, etc. may be reacted with acetaldehyde or with any of the saturated aliphatic aldehydes.

The proportions of the reagents, the time and the temperature of reaction may be widely varied both ways from those given in the example, not only for the reagents named but also for other reagents. For instance, from less than one part to more than one hundred parts of acetaldehyde may be condensed with one hundred parts of vinyl acetate.

The proportion of catalyst may also be varied. The preferred amount is between .01% and .1% but the range may be much wider, especially in the direction of greater amounts. The amount of catalyst is to some extent dependent on the presence and amount of certain impurities, such as sulphur compounds, in the vinyl ester.

Having thus described my invention, what I claim is:—

1. A process of making a condensation product of an aliphatic vinyl ester and a saturated aliphatic aldehyde, which comprises heating them together under pressure in presence of benzoyl peroxide as catalyst.

2. A process of making a condensation product of vinyl acetate and acetaldehyde, which comprises heating them together under pressure in presence of benzoyl peroxide as catalyst.

3. A process of making a condensation product of a saturated aliphatic aldehyde and an aliphatic vinyl ester, which comprises heating the ester with more than 3% of its weight of the aldehyde in presence of benzoyl peroxide as catalyst.

4. A process of making a condensation product of a saturated aliphatic aldehyde and an aliphatic vinyl ester, which comprises heating the ester under pressure with more than 3% of its weight of the aldehyde in presence of benzoyl peroxide as catalyst.

5. A process of making a condensation product of acetaldehyde and vinyl acetate, which comprises heating the ester with more than 3% of its weight of the aldehyde in presence of benzoyl peroxide as catalyst.

6. A process of making a condensation product of acetaldehyde and vinyl acetate, which comprises heating the ester under pressure with more than 3% of its weight of the aldehyde in presence of benzoyl peroxide as catalyst.

7. A process of making a condensation product of a saturated aliphatic aldehyde and an aliphatic vinyl ester, which comprises heating the ester with the aldehyde in presence of benzoyl peroxide as catalyst in amount between approximately 0.1% and .01% of the weight of the ester.

8. A process of making a condensation product of acetaldehyde and vinyl acetate, which comprises heating the ester with the aldehyde in presence of benzoyl peroxide as catalyst in amount approximately 0.1% and .01% of the weight of the ester.

9. A process of making a condensation product of a saturated aliphatic aldehyde and an aliphatic vinyl ester, which comprises heating the ester with more than 3% of its weight of the aldehyde in presence of benzoyl peroxide as catalyst in amount between approximately 0.1% and .01% of the weight of the ester.

10. A process of making a condensation product of acetaldehyde and vinyl acetate, which comprises heating the ester with more than 3% of its weight of the aldehyde in presence of benzoyl peroxide as catalyst in amount between approximately 0.1% and .01% of the weight of the ester.

11. A process of making a condensation product of a saturated aliphatic aldehyde and an aliphatic vinyl ester, which comprises heating the aldehyde and ester together in presence of benzoyl peroxide in amount ranging downwardly from approximately 0.1% of the weight of the ester.

12. A process of making a condensation product of acetaldehyde and vinyl acetate, which comprises heating the aldehyde and ester together in presence of benzoyl peroxide in amount ranging downwardly from approximately 0.1% of the weight of the ester.

In witness whereof, I have hereunto set my hand:

FREDERICK W. SKIRROW.